United States Patent
Tung

(10) Patent No.: US 6,428,021 B1
(45) Date of Patent: Aug. 6, 2002

(54) FOLDING AND POSITIONING DEVICE OF SCOOTER

(76) Inventor: Ko Chen Tung, No. 70, Lane 26, Chungyi 3 Rd., Dajia Jen, Taichung (TW), 437

( * ) Notice: Subject to any disclaimer, the term of this patent is extended or adjusted under 35 U.S.C. 154(b) by 0 days.

(21) Appl. No.: 09/809,175

(22) Filed: Mar. 16, 2001

(51) Int. Cl.⁷ .................................................. B62M 1/00
(52) U.S. Cl. .............................. 280/87.041; 280/87.05
(58) Field of Search ...................... 280/87.041, 87.042, 280/87.05, 14.27, 87.021, 87.01; 403/91, 92, 94, 96, 101, 99, 325

(56) References Cited

U.S. PATENT DOCUMENTS

| | | | | |
|---|---|---|---|---|
| 6,158,751 A | * | 12/2000 | Wu et al. ............... | 280/87.041 |
| 6,173,976 B1 | * | 1/2001 | Lee ......................... | 280/87.05 |
| 6,182,988 B1 | * | 2/2001 | Wu ......................... | 280/87.041 |
| 6,193,248 B1 | * | 2/2001 | Liu ......................... | 280/87.041 |
| 6,206,387 B1 | * | 3/2001 | Tsai ........................ | 16/359 |
| 6,234,501 B1 | * | 5/2001 | Chen ....................... | 16/900 |
| 6,260,866 B1 | * | 7/2001 | Cheng .................... | 280/87.041 |
| 6,270,095 B1 | * | 8/2001 | Chang .................... | 280/87.041 |
| 6,276,701 B1 | * | 8/2001 | Chen ....................... | 280/87.05 |
| 6,286,845 B1 | * | 9/2001 | Lin .......................... | 16/324 |
| 6,332,621 B1 | * | 12/2001 | Wu .......................... | 16/900 |

* cited by examiner

Primary Examiner—Anne Marie Boehler
Assistant Examiner—Bridget Avery
(74) Attorney, Agent, or Firm—Rosenberg, Klein & Lee

(57) ABSTRACT

A folding and positioning device of a scooter includes a base secured to the frame of the scooter; a connecting lever having a first end secured to the head tube of the scooter and a second end pivotally mounted on the base by a shaft; a locking bracket slidably mounted on the connecting lever, and having one end capable of being inserted into one of the insertion grooves defined in the base; a handle secured on the locking bracket; and an elastic member having a first end secured to the shaft and a second end secured to the handle. In such a manner, the head tube can be operated and folded easily, thereby ensuring the safety of use.

4 Claims, 5 Drawing Sheets

FOLDING AND POSITIONING DEVICE OF SCOOTER

BACKGROUND OF THE INVENTION

1. Field of the Invention

The present invention relates to a folding and positioning device of a scooter, and more particularly to a folding and positioning device which can be folded and operated easily and conveniently.

2. Description of the Related Prior Art

A conventional scooter in accordance with the prior art occupies a determined space when not in use. In addition, the scooter has a large volume and cannot be stored easily, so that when the scooter is used outdoors, it cannot be stored and hidden conveniently due to its constant volume, thereby limiting the versatility of the conventional scooter. Further, the conventional scooter cannot be positioned accurately and cannot be folded conveniently.

SUMMARY OF THE INVENTION

In accordance with the present invention, there is provided a folding and positioning device of a scooter comprising:

- a base secured to a frame of a scooter and including two opposite parallel ear plates, each of the two ear plates having an outer periphery defining a first insertion groove and a second insertion groove spaced from each other;
- an elongated connecting lever having a first end secured to a head tube of the scooter and a second end pivotally mounted between the two ear plates of the base, the connecting lever having a top face defining an elongated slot and having two sides each defining an elongated slide track;
- a shaft extending through the two ear plates of the base and the connecting lever such that the connecting lever is pivoted between the two ear plates of the base;
- a locking bracket slidably mounted on the top face of the connecting lever, and having two sides each formed with a slide slidably mounted in the slide track of the connecting lever, each of the two sides of the locking bracket capable of being inserted into one of the first insertion groove and the second insertion groove of the ear plate of the base;
- a handle secured on the locking bracket, and having a first end formed with a handgrip protruding outward from the locking bracket, and a second end formed with a bolt extended through the elongated slot of the connecting lever and received in an inside of the connecting lever; and
- an elastic member mounted in the connecting lever and having a first end secured to the shaft and a second end secured to the bolt of the handle.

Each of the two sides of the locking bracket is formed with a wedge-shaped locking tenon capable of being inserted into one of the first insertion groove and the second insertion groove of the ear plate of the base.

The locking bracket defines a screw hole, and the bolt of the handle is formed with a threaded portion screwed into the screw hole of the locking bracket.

Preferably, the handgrip of the handle has a ball shape that is designed ergonomically.

Further benefits and advantages of the present invention will become apparent after a careful reading of the detailed description with appropriate reference to the accompanying drawings.

DETAILED DESCRIPTION OF THE INVENTION

Figure 1:
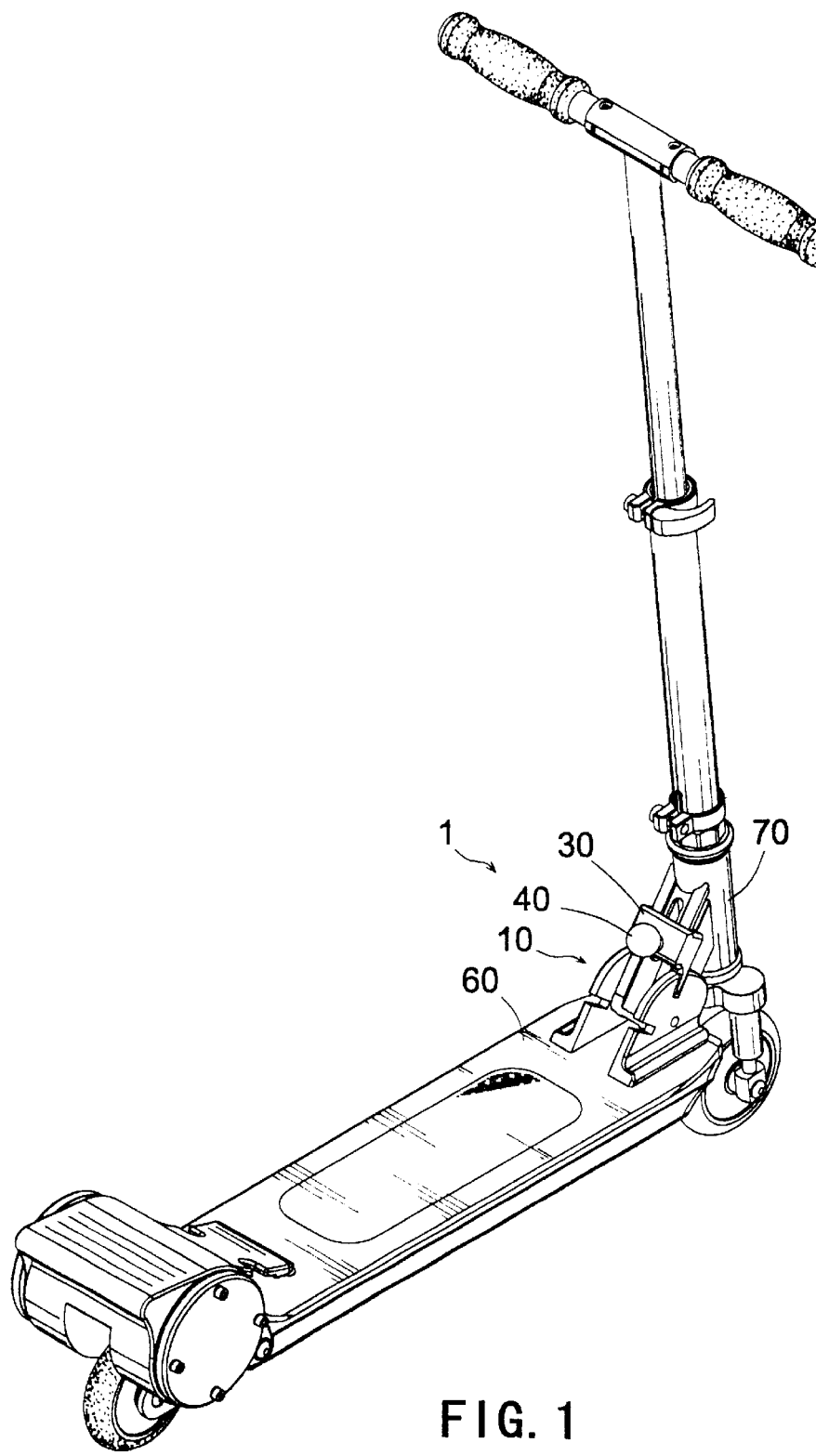
FIG. 1 is a perspective view of a folding and positioning device of a scooter in accordance with the present invention.
Figure 2:
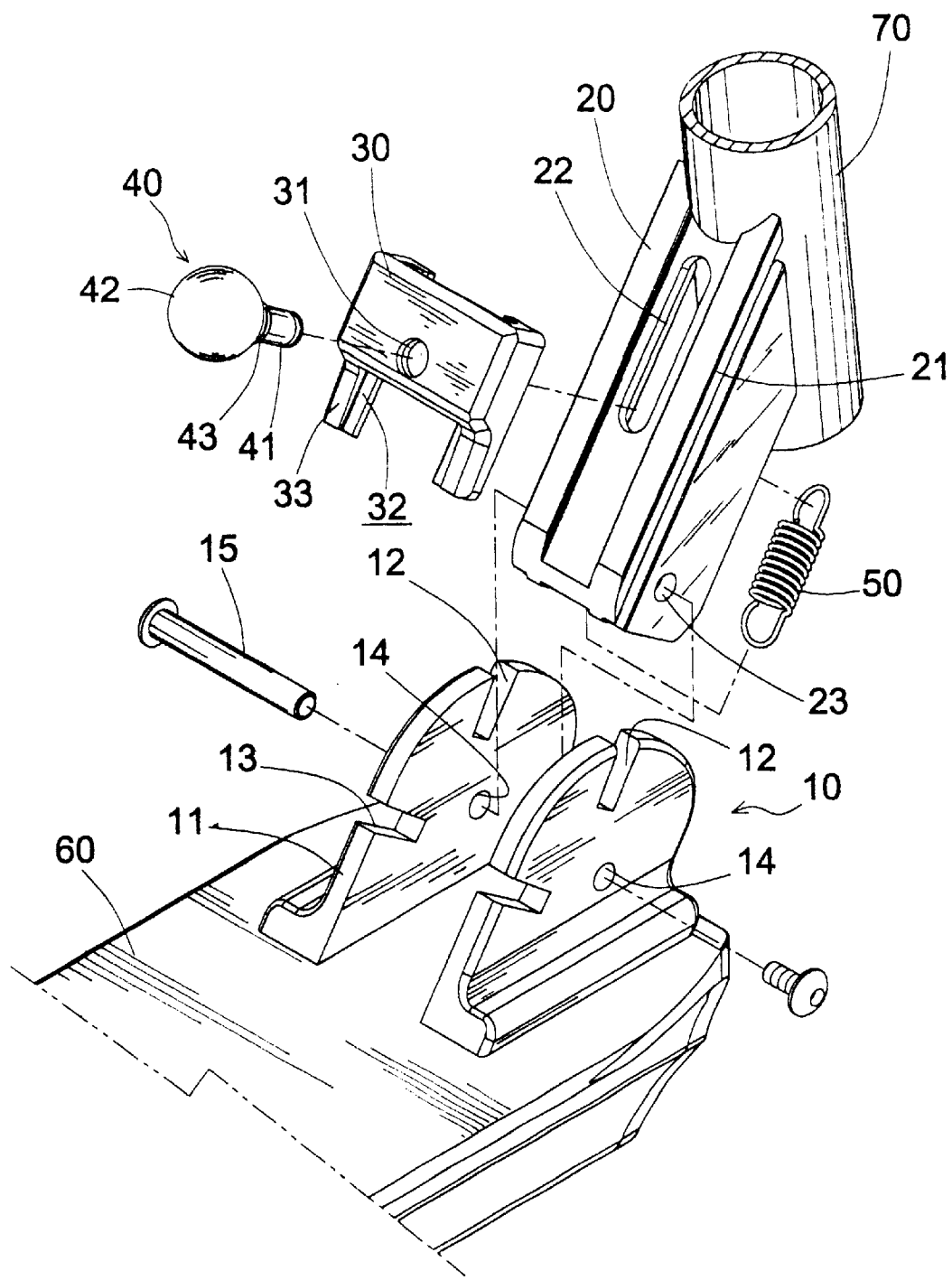
FIG. 2 is an exploded perspective view of the folding and positioning device of a scooter as shown in FIG. 1.
Figure 3:
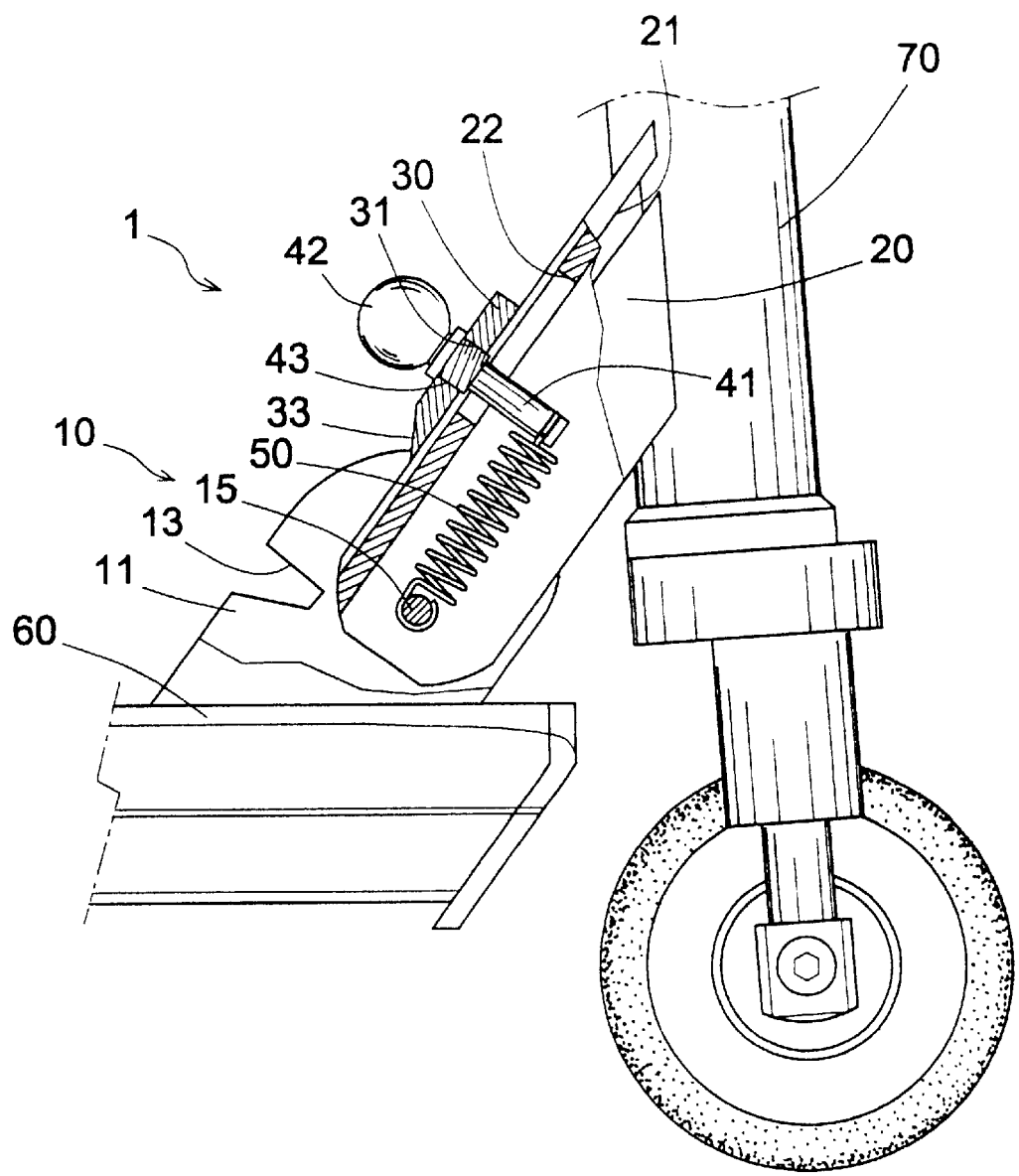
FIG. 3 is a partially cut-away side plan cross-sectional view of the folding and positioning device of a scooter as shown in FIG. 1.

Referring to the drawings and initially to FIGS. 1–3, a folding and positioning device 1 of a scooter in accordance with the present invention is mounted between the frame 60 and the head tube 70 of the scooter, so that the head tube 70 can be folded toward the frame 60.

As shown in FIG. 2, the folding and positioning device comprises a base 10, connecting lever 20, a locking bracket 30, a handle 40, and an elastic member 50.

The base 10 is secured to the frame 60 of the scooter and includes two opposite parallel ear plates 11. Each of the two ear plates 11 has an outer periphery defining a first insertion groove 12 and a second insertion groove 13 spaced from each other.

The connecting lever 20 is an elongated block having a substantially inverted U-shaped cross-section, and has a closed side directed upward. The elongated connecting lever 20 has a first end secured to the head tube 70 of the scooter in an inclined manner and a second end pivotally mounted between the two ear plates 11 of the base 10. The shaft 15 in turn extends through the axial hole 14 defined in each of the two ear plates 11 of the base 10 and through the through hole 23 defined in the connecting lever 20 such that the connecting lever 20. is pivoted between the two ear plates 11 of the base 10. The connecting lever 20 has a top face defining an elongated slot 22 and has two sides each defining an elongated slide track 21.

The locking bracket 30 is a substantially inverted U-shaped bracket consisting of three plates. The locking bracket 30 is slidably mounted on the top face of the connecting lever 20, and has two sides each formed with a slide 32 slidably mounted in the slide track 21 of the connecting lever 20. Each of the two sides of the locking bracket 30 is capable of being inserted into the first insertion groove 12 or the second insertion groove 13 of the ear plate 11 of the base 10. Preferably, each of the two sides of the locking bracket 30 is formed with a wedge-shaped locking tenon 33 capable of being inserted into the first insertion groove 12 or the second insertion groove 13 of the ear plate 11 of the base 10.

The handle 40 is secured on the locking bracket 30, and has a first end formed with a handgrip 42 protruding outward from the locking bracket 30, and a second end formed with a bolt 41 in turn extended through the screw hole 31 defined in the locking bracket 30, and through the elongated slot 22 of the connecting lever 20 into the hollow inside of the connecting lever 20. The locking bracket 30 defines a screw hole 31, and the bolt 41 of the handle 40 is formed with a threaded portion. 43 screwed into the screw hole 31 of the locking bracket 30. Preferably, the handgrip 42 of the handle 40 has a ball shape that is designed ergonomically.

The elastic member 50 is mounted in the connecting lever 20 and has a first end secured to the shaft 15 and a second end secured to the bolt 41 of the handle 40 as shown in FIG. 3, such that the locking tenons 33 of the locking bracket 30 is kept being inserted into the first insertion groove 12 of the ear plate 11 of the base 10 constantly, thereby preventing the locking tenons 33 from detaching from the insertion groove 12 of the base 10 during movement of the scooter, so as to enhance the safety of the scooter in use.

Figure 4:
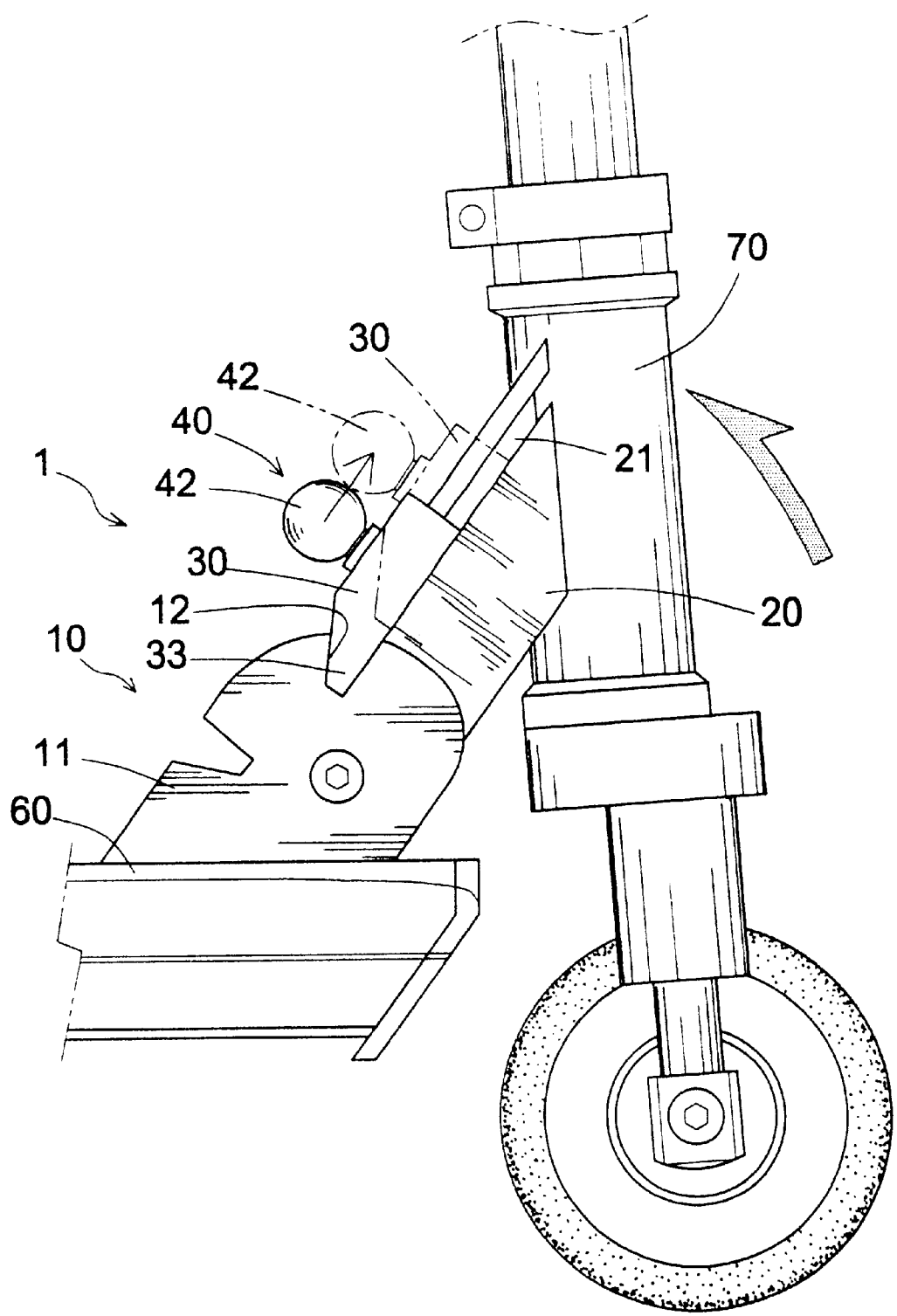
FIG. 4 is a schematic operational view of the folding and positioning device of a scooter as shown in FIG. 3 in use.
Figure 5:
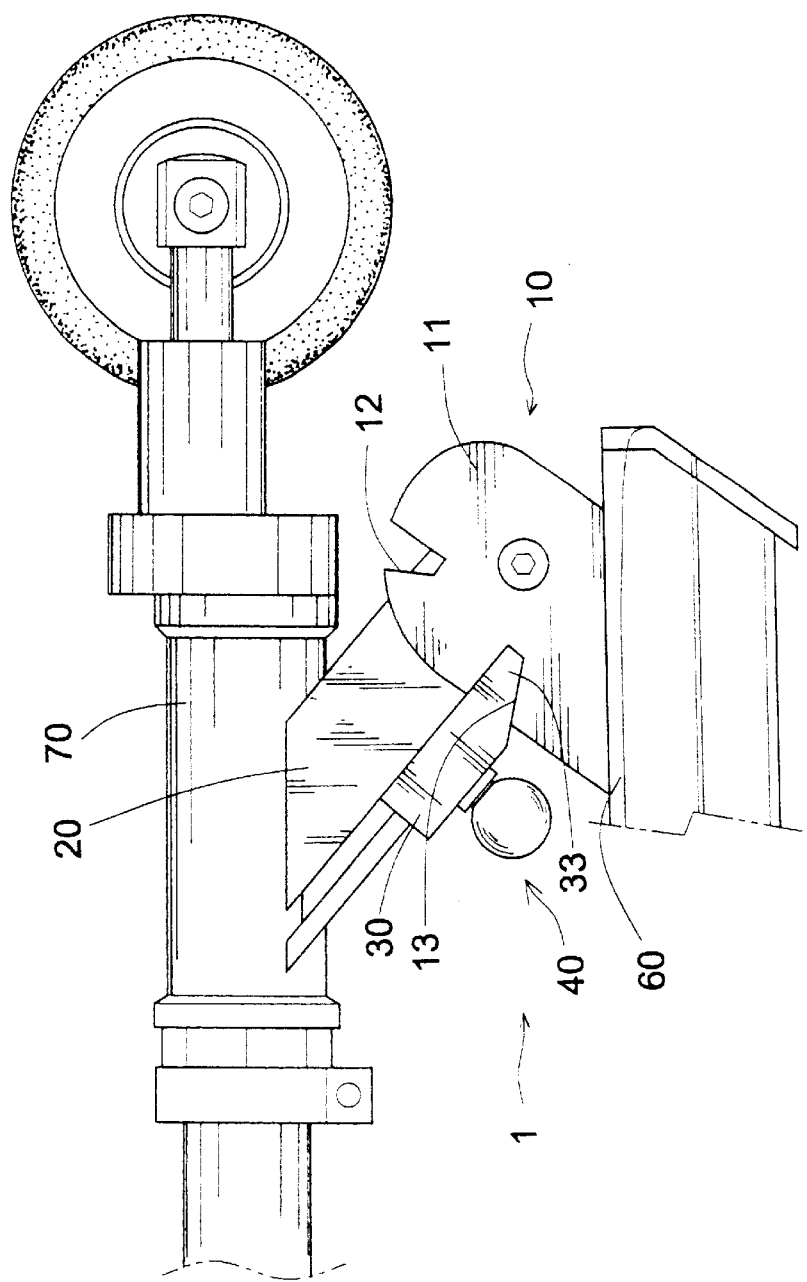
FIG. 5 is a schematic operational view of the folding and positioning device of a scooter as shown in FIG. 4, wherein the head tube of the scooter is folded.

In operation, referring to FIGS. 3–5 with reference to FIGS. 1 and 2, when the user wishes to fold the folding and positioning device 1, the handgrip 42 of the handle 40 is pushed upward toward the head tube 70, to move the locking bracket 30 upward along the slide track 21 of the connecting lever 20, thereby detaching the locking tenon 33 of the locking bracket 30 from the first insertion groove 12 of the ear plate 11 of the base 10 as shown in phantom lines in FIG. 4, such that the connecting lever 20 can be pivoted relative to the base 10 about the shaft 15, so as to move the connecting lever 20 together with the head tube 70 from the position as shown in FIG. 4 to the position as shown in FIG. 5 where the locking tenon 33 of the locking bracket 30 aligns with the second insertion groove 13 of the ear plate 11 of the base 10, so that the locking tenon 33 of the locking bracket 30 can be pulled to be inserted into the second insertion groove 13 of the ear plate 11 of the base 10 by the restoring force of the elastic member 50, thereby folding and positioning the head tube 70 on the frame 60 as shown in FIG. 5.

Accordingly, the user can fold the scooter easily, thereby facilitating the folding operation of the scooter. In addition, the scooter is portable and can be stored conveniently. Further, when the head tube is fully expanded, the scooter can be operated safely.

While the preferred embodiment of the present invention has been shown and described, it will be apparent to those skilled in the art that various modifications may be made in the embodiment without departing from the spirit of the present invention. Such modifications are all within the scope of the present invention.

What is claimed is:

1. A folding and positioning device of a scooter comprising:

a base (10) secured to a frame (60) of a scooter and including two opposite parallel ear plates (11), each of said two ear plates (11) having an outer periphery defining a first insertion groove (12) and a second insertion groove (13) spaced from each other;

an elongated connecting lever (20) having a first end secured to a head tube (70) of said scooter and a second end pivotally mounted between said two ear plates (11) of said base (10), said connecting lever (20) having a top face defining an elongated slot (22) and having two sides each defining an elongated slide track (21);

a shaft (15) extending through said two ear plates (11) of said base (10) and said connecting lever (20) such that said connecting lever (20) is pivoted between said two ear plates (11) of said base (10);

a locking bracket (30) slidably mounted on said top face of said connecting lever (20), and having two sides each formed with a slide (32) slidably mounted in said slide track (21) of said connecting lever (20), each of said two sides of said locking bracket (30) capable of being inserted into one of said first insertion groove (12) and said second insertion groove (13) of said ear plate ( 11) of said base (10);

a handle (40) secured on said locking bracket (30), and having a first end formed with a handgrip (42) protruding outward from said locking bracket (30), and a second end formed with a bolt (41) extended through said elongated slot (22) of said connecting lever (20) and received in an inside of said connecting lever (20); and an elastic member (50) mounted in said connecting lever (20) and having a first end secured to said shaft (15) and a second end secured to said bolt (41) of said handle (40).

2. The folding and positioning device of a scooter in accordance with claim 1, wherein each of said two sides of said locking bracket (30) is formed with a wedge-shaped locking tenon (33) capable of being inserted into one of said first insertion groove (12) and said second insertion groove (13) of said ear plate (1) of said base (10).

3. The folding and positioning device of a scooter in accordance with claim 1, wherein said locking bracket (30) defines a screw hole (31), and said bolt (41) of said handle (40) is formed with a threaded portion (43) screwed into said screw hole (31) of said locking bracket (30).

4. The folding and positioning device of a scooter in accordance with claim 1, wherein said handgrip (42) of said handle (40) has a ball shape that is designed ergonomically.

\* \* \* \* \*